May 29, 1923.
M. RESEK
BAIL ATTACHING MEANS
Filed April 12, 1919
1,456,716
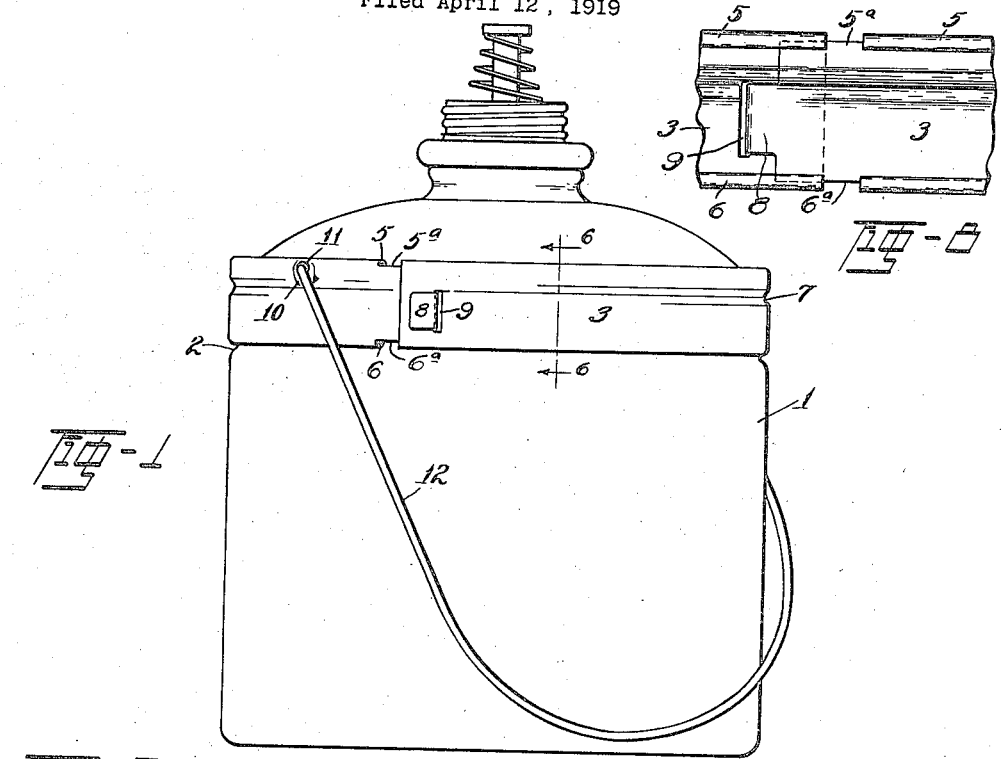
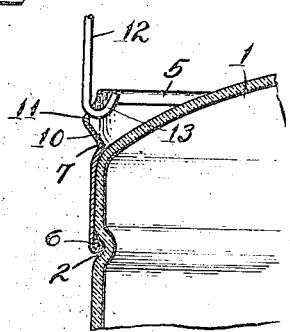
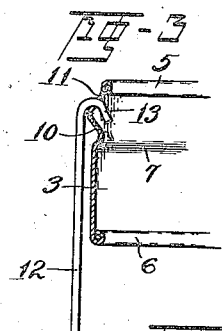
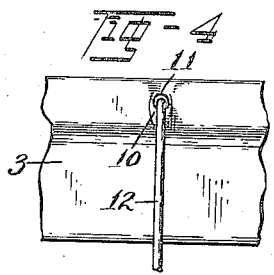
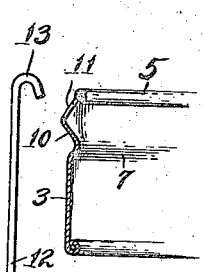
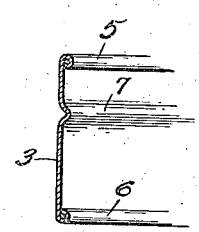
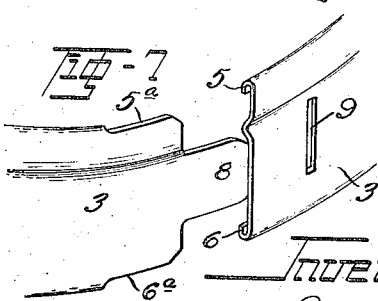
Inventor
Marc Resek,
By Hull, Smith, Brock & West
Attys.

Patented May 29, 1923.

1,456,716

UNITED STATES PATENT OFFICE.

MARC RESEK, OF CLEVELAND HEIGHTS, OHIO, ASSIGNOR TO THE CLEVELAND METAL PRODUCTS COMPANY, OF CLEVELAND, OHIO, A CORPORATION OF OHIO.

BAIL-ATTACHING MEANS.

Application filed April 12, 1919. Serial No. 289,600.

*To all whom it may concern:*

Be it known that I, MARC RESEK, a citizen of the United States, residing at Cleveland Heights, in the county of Cuyahoga and State of Ohio, have invented a certain new and useful Improvement in Bail-Attaching Means, of which the following is a full, clear, and exact description, reference being had to the accompanying drawings.

This invention relates to means for attaching bails to vessels, especially to vessels made of glass or the like.

The object of the invention is to provide simple and inexpensive means through which bails may be attached to vessels, especially vessels of vitreous or like material in a particularly facile, expeditious and economical manner; and to this end the invention consists generally in providing a member wherewith a bail may be interlocked, preferably for swinging movement, and without the use of tools; and which member may then be applied to a vessel and held in place, preferably by means innate of itself—the parts co-acting after assembly to prevent disengagement of the bail from the member.

A construction through which the foregoing objects is accomplished is illustrated in the drawing accompanying and forming a part hereof, and wherein Fig. 1 is a side elevation of a vessel having a bail attached to it by the means of my invention; Fig. 2, is a sectional detail through adjacent parts of the bail attaching member and vessel showing the bail connection; Fig. 3 shows the bail attaching member in section and removed from the vessel, with the bail hanging vertically therefrom; Fig. 4 is an elevational view of the parts of Fig. 3, showing the perpendicular relation of bail and member; Fig. 5 shows the parts of Fig. 3 separated; Fig. 6 is a section through the bail attaching member revealing its normal cross-section, the view being taken on line 6—6 of Fig. 1; Fig. 7 shows the ends of the bail attaching member separated; and Fig. 8 is an inside view of the connected ends of the member.

A vessel which may be of glass and in the present instance is shown in the form of a bottle is designated 1, and near its upper end is provided with a circumferential groove 2.

3 is a bail attaching member that is shown in the form of a metal band having its upper and lower edges curled inward to provide beds or flanges 5 and 6, respectively. Intermediate its edges, the web of the member 3 is creased inwardly to produce a ridge 7. One end of the band or member 3 is reduced in width to provide a tongue 8, and inward for a suitable distance from the reduced end the curled over edges or beads 5 and 6 are cut away, as indicated at 5ª and 6ª, respectively. The opposite end of the band is provided with a transverse slot 9. After the bail has been attached to the band in a manner hereinafter explained and the band drawn about the vessel with its bead 6 engaged within the groove 2 and its ridge 7 overlying the upper end of the vessel, the tongue 8 may be projected through slot 9 and bent back over the adjacent opposite end portion of the band, as shown in Fig. 1; and the curled over edges of the end of the band that is provided with slot 9, are left open sufficiently to receive the edged portions 5ª and 6ª of the tongued end of the band. This manner of connecting the ends of the band will be readily understood from an inspection of Figs. 1, 7 and 8.

At diametrically opposite points the material of the band or member 3 is bulged outwardly above the ledge 7, as indicated at 10, and the upper slope of the bulged portion is perforated at 11.

12 is a bail that is adapted to be connected to the band or member 3 by means of its hooked ends 13. When the band or member 3 is free from the vessel, the bail 12 may be placed in a plane at right angles to that of the band or member as indicated in Fig. 5. When the parts are in this position it is an easy matter to insert the hooked ends 13 of the bail downwardly through the apertures 11, in which condition they are represented in Fig. 3. As the bail is turned one way or the other from a right angular position with respect to the plane of member 3, its disconnection from the member is prevented by the engagement of its hooked ends with the side or bottom walls of apertures 11. After the bail is thus connected to the member 3, the member is placed about the vessel as above explained, and when the parts are so assembled, the bail is prevented from resuming its former right angular relation to the band or member 3 by engagement with the sides of the vessel.

Thus it will be seen that my invention provides a simple and efficient means of attaching a bail to a vessel, particularly a vessel of glass or the like, in a very convenient and cheap manner.

The advantage of my invention will be more fully appreciated when it is recalled that heretofore it has been necessary to bend over or otherwise treat the ends of the bail after they had been projected through the apertures of the article to which the bail was to be attached. This operation was expedited by the aid of a press, but at the best was awkward and consumed considerable time.

Having thus described my invention, what I claim is:

1. The combination of a vessel having a circumferential groove, a band designed to encircle the vessel and having a part for engagement within said groove thereby to hold the band in place upon the vessel, a bail having parts for interlocking engagement with and disengagement from portions of the band when the bail occupies a given position with respect to the band, the vessel serving to prevent the bail from assuming said given position when the band is applied to the vessel.

2. The combination of a vessel having a circumferential groove spaced downward from its upper end, a band designed to encircle the vessel and having its lower edge directed inwardly for engagement within the groove and a part designed to overlie the upper end of the vessel, the band having outwardly bulged portions that are disposed substantially diametrically opposite each other, the upper slope of each bulged portion having an aperture, a bail having its ends turned inwardly to provide hooks that may be engaged through said apertures when the bail occupies a position below and substantially perpendicular to the plane of the band, the vessel being so proportioned that when the band is applied to the vessel, the bail will engage the side of the vessel and thereby be prevented from assuming the aforesaid perpendicular relation to the band.

3. In combination with a vessel, a member for attachment to said vessel, said member having outwardly bulged portions that are disposed substantially diametrically opposite each other, the upper slope of each bulged portion having an aperture, a bail having its ends turned inwardly to provide hooks that may be engaged through said apertures when the bail occupies a position below and substantially perpendicular to the plane of said member, the vessel being so proportioned that when the member is applied to the vessel the bail will engage the side of the vessel and thereby be prevented from assuming the aforesaid perpendicular relation to the member.

4. In combination, a vessel, a member for application thereto, and a bail for attachment to the member, the member and bail having parts which are designed to be interengaged with each other for attaching the bail to the member when the bail and member occupy a position with respect to each other which relative position the parts are prevented from assuming by reason of the presence of the vessel when said member is applied to the vessel.

5. The combination of a member designed to be removably applied to a vessel and having bail receiving apertures, and a bail having its ends formed for detachable engagement within said apertures, the parts being so shaped and proportioned that the attachment of the bail with the member and its detachment therefrom are possible only when the bail occupies a position with respect to the member which is impossible of assuming when the member is applied to a vessel.

In testimony whereof, I hereunto affix my signature.

MARC RESEK.